United States Patent Office 3,329,530
Patented July 4, 1967

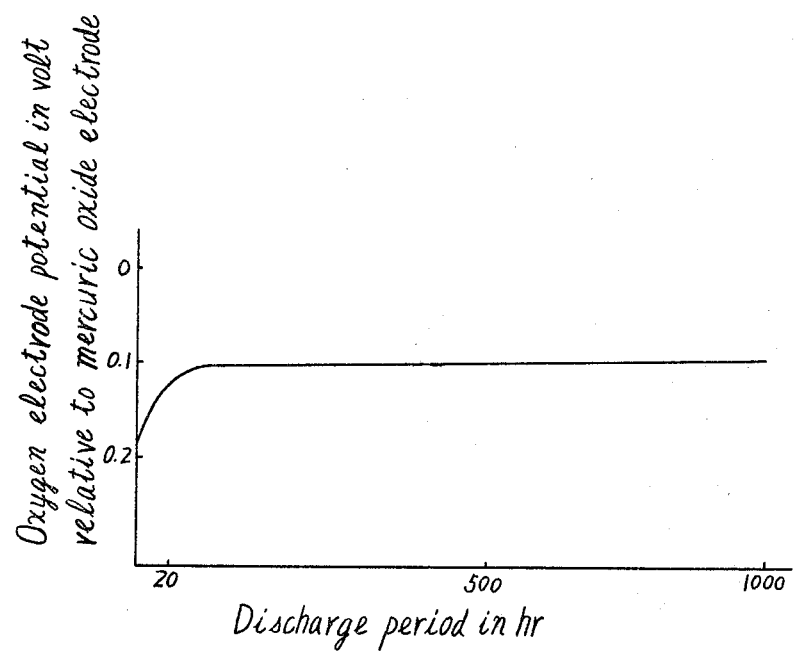

3,329,530
SINTERED FUEL CELL ELECTRODE COMPRISING FLUORINE-CONTAINING MONOMER
Yutaka Kometani, Sanda-shi, Akira Yamada, Takatsuki-shi, and Seisuke Suzue, Osaka-shi, Japan, assignors to Daikin Kogyo Kabushiki Kaisha, Osaka-shi, Japan, a juridical person of Japan
Filed Mar. 24, 1965, Ser. No. 442,304
Claims priority, application Japan, Mar. 25, 1964, 39/16,582
4 Claims. (Cl. 136—120)

This invention relates to electrodes, and more particularly to the electrodes for use in fuel cells.

Fuel cells in which a fuel is oxidized by electrochemical reaction and the resultant energy is converted to electrical power are known in the art. Such fuel cells generally comprise carbon or nickel electrodes; a gaseous or liquid fuel, such as hydrogen, chlorine, a hydrocarbon, methanol or hydrazine; an oxidant, such as oxygen or air; and an alkaline electrolyte, such as an aqueous solution of potassium hydroxide. In order for the electrodes employed in such cells to work effectively over long periods of sustained operation, following requirements should be satisfied:

The electrodes employed should have micropores distributed uniformly throughout the layers for an effective diffusion and ionization of the fuel and oxidant employed;

The electrodes employed should have good water-repellency so as to protect the electrode from being flooded with the electrolyte employed, because the electrolyte flooding of the electrode reduces the reaction area and obstructs the diffusion and ionization of the fuel and oxidant employed with a deterioration in the resultant working efficiency;

The internal resistance of the electrodes should be reduced to a minimal extent so as to secure a maximum outer current of electricity; and The method for the manufacture of said electrodes should be facilitated so as to produce the desired articles of uniform quality.

In the prior art, however, there has not yet been provided such electrodes meeting all of the aforedescribed desiderata to a satisfactory extent. For instance, the electrodes manufactured according to a known method in which a carbon or nickel structure is treated with a water-repellent substance, such as paraffin wax, polyethylene, silicone or the like, are apt to be easily poisoned or damaged in the alkaline electrolyte because of the poor order of resistance of said substances to chemicals, particularly to alkali, so that the resultant articles, when employed in fuel cells, cannot maintain its working efficiency over long periods of sustained operation.

One object of this invention is accordingly to provide an electrode displaying an extremely high order of working efficiency in a fuel cell over long periods of sustained operation.

Another object of the invention is the provision of an electrode having a high order of porosity, an excellent water-repellency durable for a long period of time, and good order of resistance to chemicals, particularly to alkali.

A further object of the invention is the provision of a simple and profitable method for the manufacture of the electrodes of aforesaid characters.

Other objects and specific features of the invention will become apparent in view of the following:

The electrode of this invention is a sintered product comprising in combination from 50 to 95 percent by volume of an electrically conductive material, such as carbon or nickel, and from 50 to 5 percent by volume as a binder of a copolymer of from 70 to 95 percent by weight of tetrafluoroethylene and from 30 to 5 percent by weight of a fluorine-containing monomer other than tetrafluoroethylene, and having a porosity of from 25 to 70 percent by volume, preferably from 30 to 60 percent by volume.

The order of porosity employed in this specification and the appended claims is defined as below:

$$\text{Porosity (percent by volume)} = \left(1 - \frac{D_1}{D_2}\right) \times 100$$

wherein $D_1$ is an apparent density of the electrode obtained, and $D_2$ is a theoretical density calculated in terms of the composition ratio and the density of each of the components of said electrode.

The electrodes of this invention have micropores uniformly distributed throughout the layers, and the order of porosity thereof ranges, as stated before, from 25 to 70 percent by volume. Said electrodes are further provided with a uniform and good water-repellency effective over long periods of sustained operation; good durability and anti-chemical resistance; and a high order of working efficiency over long periods of sustained operation.

Such effects and specific features of this invention cannot be obtained without the use of the tetrafluoroethylene-containing copolymer as specified before. Other binders cannot achieve the contemplated effects. For instance, the employment of homopolymers of tetrafluoroethylene fails to produce the desired uniform water-repellency and uniform distribution of micropores of identical size, so that the resultant article cannot maintain the desired working efficiency over long periods of sustained operation.

The tetrafluoroethylene-containing copolymer employed as a binder in this invention should contain from 70 to 95 percent by weight, preferably from 80 to 90 percent by weight, of tetrafluoroethylene, and from 30 to 5 percent by weight, preferably from 20 to 10 percent by weight, of fluorine-containing monomers other than tetrafluoroethylene. When a copolymer in which the content of tetrafluoroethylene is more than 95 percent by weight is employed, the resultant articles display no substantial difference from the articles sintered with homopolymers of tetrafluoroethylene as a binder. The manufacture of a copolymer containing tetrafluoroethylene in less than 70 percent by weight accompanies a technical difficulty, and the resultant water-repellency is insufficient. The fluorine-containing monomers employed in this invention as a representative agent to be copolymerized with tetrafluoroethylene include hexafluoropropylene, chlorotrifluoroethylene vinyl fluoride, vinylidene fluoride, and the like.

The tetrafluoroethylene-containing copolymers as specified above can be prepared by the conventional methods well known in the art, but the most desirable process is the emulsion polymerization. This method is usually carried out in the presence of a large amount of water containing a polymerization initiator and a dispersant which are employed for the polymerization of tetrafluoroethylene. The polymerization initiator employed in this invention includes organic and inorganic peroxides and organic azo compounds; and the dispersant employed comprises ionic and nonionic fluorine-containing surface active agents. One embodiment of said emulsion polymerization is described in British Patent 755,183 wherein tetrafluoroethylene is polymerized with hexafluoropropylene.

The most desirable method for manufacturing the electrodes of this invention comprises preforming in a mold a powder mixture of an electrically conductive material and a tetrafluoroethylene-containing copolymer as specified above in a mold under pressure, and then sintering the resultant article at a temperature substantially higher than the melting point of the copolymer employed.

The electrically conductive material employed in this invention includes conventional carbon or nickel in common use for the fuel cell electrodes. Said material is employed in the form of powder or particles having diameters in the order of less than 150 microns, preferably in the order of less than 50 microns.

The tetrafluoroethylene-containing copolymer as a binder is also employed in the form of powder or particles of less than 100 microns in diameter. The more minute the particles, the more uniformly dispersed said copolymer is in the electrically conductive material, so that there is obtained a particularly uniform water-repellency. The most desirable size of the particles accordingly ranges from 0.2 to 40 microns. The copolymer having such minute and uniform sizes are prepared by coagulating an aqueous dispersion obtained by dispersion copolymerization of tetrafluoroethylene and a fluorine-containing monomer other than tetrafluoroethylene. The resultant products are usually of spherical particles having diameters less than 1 micron on the average. Such minute particles may also be prepared by pulverizing a copolymer obtained by other polymerization methods. But the particles in the range of from 0.2 to 40 microns cannot be prepared or can hardly be available from homopolymers of tetrafluoroethylene, because the resultant particles aggregate with one another when coagulated and fibrify when pulverized.

The electrically conductive material is employed in the form of powder or particles in the order of from 50 to 95 percent by volume, preferably from 70 to 90 percent by volume, in admixture with said tetrafluoroethylene-containing copolymer powder or particles in the order of from 50 to 5 percent by volume, preferably from 30 to 10 percent by volume.

The resultant mixture is preformed in a mold under an increased pressure. The pressure to be applied is dependent upon the content of the binder employed, but can be selected from a wide range of from 10 to 1,200 kg./cm.$^2$. When the copolymer content is high, a pressure from 10 to 100 kg./cm.$^2$ may be sufficient, but a pressure ranging from 1,000 to 1,200 kg./cm.$^2$ should be applied to a mixture where the copolymer content is small. The pressure is preferably raised not violently but gradually and maintained at said order for about 5 minutes at least.

The aforesaid preforming can be carried out at normal room temperatures or under application of heat. Application of heat, however, should be confined to the range of a temperature not higher than the melting point of the copolymer employed, although said application is advantageous for reducing the pressure to be employed.

The article thus preformed is sintered at a tempearture ranging from the melting point to the decomposition temperature of the copolymer employed. The sintering is usually carried out after removing the article from the mold. It can however be carried out in the mold, too. The sintering further is desirably carried out in the stream of nitrogen gas or the like inert gas, because the presence of oxygen leads to the oxidation of the electrically conductive material with an increased loss in the weight of the resultant material and a deterioration in the working efficiency.

The sintering temperature is further dependent upon the species of the tetrafluoroethylene-containing copolymer employed. For instance, when a copolymer of tetrafluoroethylene and hexafluoropropylene is employed, it is advantageous to apply a temperature within the range of from 300° to 360° C. The period of sintering in this invention varies over a wide range, but preferably ranges from 10 to 200 minutes.

The employment as a binder of the aforespecified tetrafluoroethylene-containing copolymer has made it possible to produce an article having micropores uniformly distributed throughout the layers thereof with such a high order of porosity as said before. The copolymer particles employed hardly yield to deformation within the range of the pressures applied in the course of preforming, so that the particles do not fill up the micropores being formed in the resultant structure. Such effects cannot be obtained with tetrafluoroethylene homopolymers employed as a binder, because said homopolymers are easily subjected to deformation under the pressure applied and fill up the pores being formed in the resultant structure.

The employment of the aforespecified tetrafluoroethylene-containing copolymer as a binder, furthermore imparts to the resultant articles a good uniform water-repellency which cannot be expected of homopolymers of tetrafluoroethylene. Said tetrafluoroethylene-containing copolymers have a melt-flow property which allows the particles thereof to uniformly coat the surfaces of the resultant structure and of the micropores being formed in said structure without sacrificing the desired porosity, so that there are formed in said structure desirable areas for the reaction of the fuel and the oxidant to be employed without permitting the electrolyte to flood said structure. Such effects cannot be expected of homopolymers of tetrafluoroethylene, because said homopolymers have no such melt-flow property.

The employment of the aforespecified tetrafluoroethylene-containing copolymers as a binder, still further, imparts, as stated before, a high order of anti-chemical resistance, particularly anti-alkali resistance, and a durability effective over long periods of sustained operation.

The accompanying drawing shows a graph indicating voltage of a fuel cell obtained with an electrode according to the invention over 1000 hours of operation.

For a fuller understanding of the principles of this invention, there are described hereinafter the preferred examples which are illustrative only and not limiting the scope and extent of this invention.

*Example 1*

In an agitator-equipped autoclave were placed 12 grams of $H(CF_2)_8COONH_4$, 0.15 gram of ammonium persulfate, and 180 grams of hexafluoropropylene in 1.2 liters of deionized water, and the mixture was agitated at a speed of 300 r.p.m. while raising the temperature to 80° C. There was then added gaseous tetrafluoroethylene until the pressure in the autoclave reached 19 kg./cm.$^2$, and the composition ratio of hexafluoropropylene and tetrafluoroethylene in the gaseous phase was maintained at said level with intermittent supply of fresh portions of tetrafluoroethylene to compensate the decreasing pressure due to the consumption of the tetrafluoroethylene employed, consuming in total 490 grams of tetrafluoroethylene for 5 hours. After completion of polymerization, the hexafluoropropylene was recovered, producing 1.75 kilograms of an aqueous dispersion containing 30 percent by weight of copolymer of tetrafluoroethylene and hexafluoropropylene.

500 cc. of the resultant dispersion were placed in an agitator-equipped 3-liter vessel with 500 cc. of acetone in 750 cc. of deionized water, and the mixture was agitated violently to form a slurry. There were further added 500 cc. of deionized water and the agitation was continued until the water-repellent copolymer particles were allowed to float toward the surface of the water-acetone phase. The water-acetone phase was then evacuated, and the resultant products were washed three times with water and dried at 100° to 150° C. for 24 hours, producing a copolymer of minute particles. Infrared analyses showed that the copolymer thus prepared contained 85.5 percent by weight of tetrafluoroethylene and 15.5 percent by weight of hexafluoropropylene, and the average diameter of the particles is within the range of 0.8 micron or thereabout. 400-magnification optical observation further revealed that more than 90 percent of the particles were of 1 micron or thereabout in diameter. The melt viscosity at 380° C. was 3×10⁶ poise. Said melt viscosity was determined by the flowtester manufactured by Shimazu Seisakusho, Japan. Namely, the cylinder, 11.3 mm. in internal diameter, was filled with the copolymer as specified above and heated to 380° C. After maintaining the content at said temperature for 5 minutes, the copolymer was extruded through the orifice, 2.20 mm. in diameter and 8.00 mm. long, under a piston load of 5 kg./cm.² The Thhe melt viscosity in question was determined in terms of the formula 53.150/V, wherein V (g./min.) is the velocity of the copolymer being thus extruded.

10 grams of the copolymer particles thus prepared were thoroughly mixed with 40 grams of carbon powder passed through a 300-mesh screen, and the mixture was filled in a mold to be preformed therein under 40 kg./cm.² at 150° C. for 5 minutes. The resultant article was sintered at 340° C. for 2 hours in a nitrogen gas stream.

The article thus prepared showed no damages in the falling test from a 2-meter height to the floor. The bulk density was 0.72 g./cc. and the porosity produced was 63 percent by volume in terms of the average density of the copolymer and the carbon employed as 2.2.

The article thus obtained was employed as an oxygen electrode. An aqueous solution containing 30 percent by weight of potassium hydroxide was employed as an electrolyte and the forced current was passed at 5 ma./cm.² at a temperature from 20° to 25° C. to determine the potential difference between said electrode and the mercuric oxide electrode. The results are shown in the accompanying drawing, clearly revealing no substantial change or fluctuation in the potential for a continuous 1,000-hour operation.

*Example 2*

Tetrafluoroethylene-containing copolymer-carbon articles were prepared in accordance with the same manner as described in Example 1, except in varying composition ratio, preforming pressure and sintering period as specified in the following table wherein are shown detected properties of said articles:

| Article | Copolymer content in wt. percent | Preforming pressure in kg./cm.² | Sintering temp. in ° C. | Sintering period in hr. | Bulk density in g./cc. | Porosity in volume percent |
|---|---|---|---|---|---|---|
| 1 | 10 | 100 | 340 | 3 | 0.67 | 65.2 |
| 2 | 20 | 20 | 340 | 2 | 0.72 | 63.1 |
| 3 | 20 | 60 | 340 | 2 | 0.82 | 59.8 |
| 4 | 20 | 80 | 340 | 2 | 0.85 | 57.7 |
| 5 | 20 | 1,000 | 340 | 2 | 0.88 | 56.3 |
| 6 | 40 | 20 | 340 | 2 | 0.88 | 56.2 |
| 7 | 40 | 80 | 340 | 2 | 0.98 | 51.0 |
| 8 | 50 | 80 | 340 | 2 | 1.32 | 25.5 |

Thus, it is seen that the articles prepared in accordance with the principles of this invention have all an ability to display a high order of porosity. All of the articles further suffered no damages in the 2-meter high falling test. Particularly, Articles 2 to 7 having a porosity of from 30 to 60 percent by volume showed desirable durability in the fuel cell operation test as described in Example 1.

*Example 3*

Copolymer powder containing 81.5 percent by weight of tetrafluoroethylene and 19.5 percent by weight of hexafluoropropylene was prepared as in Example 1. The melt viscosity of the resultant particles determine as in Example 1 was 2×10⁴ poise at 380°, and the diameter and size of said particles were almost identical to those particles of Example 1.

10 grams of the resultant powder were homogeneously mixed with 40 grams of carbon powder, and the mixture was preformed in a mold under 50 kg./cm.² at 130° C. for 5 minutes, and sintered in a nitrogen gas stream at 320° C. for 2 hours, producing an article having a porosity of 58.2 percent by volume. The electrode properties of said article were as excelled as in Example 1.

Having described hereinbefore the preferred embodiments of the principles of this invention, it is apparent to those who are skilled in the art that there may be made various changes and modifications without departing from the scope and spirit of this invention. It is accordingly requested that the invention be interpreted rather broadly except otherwise specified in the appended claims.

What is claimed is:

1. A fuel cell electrode consisting essentially of a compressed and sintered mixture, said mixture essentially consisting of from 50 to 95 percent by volume of an electrically conductive material selected from the group consisting of carbon and nickel, and from 50 to 5 percent by volume of a copolymer, said copolymer consisting essentially of 70 to 95 percent by weight of tetrafluoroethylene and from 30 to 5 percent by weight of a fluorine-containing monomer other than tetrafluoroethylene, and having a porosity in the range of from 25 to 70 percent by volume in terms of $$\left(1 - \frac{D_1}{D_2}\right) \times 100$$

wherein $D_1$ is an apparent density of the resultant article, and $D_2$ is a theoretical density calculated in terms of the composition ratio and the density of each components of said article.

2. The fuel cell electrode of claim 1, wherein said other fluorine-containing monomer is a member selected from the group consisting of hexafluoropropylene, chlorotrifluoroethylene, vinyl fluoride, and vinylidene fluoride.

3. The fuel cell electrode of claim 1, wherein said copolymer consisting essentially of 70 to 95 percent by weight of tetrafluoroethylene and from 30 to 5 percent by weight of hexafluoropropylene.

4. A fuel cell electrode consisting essentially of a compressed and sintered mixture, said mixture essentially consisting of from 70 to 90 percent by volume of an electrically conductive material selected from the group consisting of carbon and nickel, and from 30 to 10 percent by volume of a copolymer, said copolymer consisting essentially of 70 to 95 percent by weight of tetrafluoroethylene and from 30 to 5 percent by weight of a fluorine-containing monomer selected from the group consisting of hexafluoropropylene, chlorotrifluoroethylene, vinyl fluoride, and vinylidene fluoride, and having a porosity in the range of from 30 to 60 percent by volume in terms of $$\left(1 - \frac{D_1}{D_2}\right) \times 100$$

wherein $D_1$ is an apparent density of the resultant article, and $D_2$ is a theoretical density calculated in terms of the composition ratio and the density of each components of said article.

(References on following page)

References Cited

UNITED STATES PATENTS

| | | | |
|---|---|---|---|
| 2,824,165 | 2/1958 | Marsal | 136—122 |
| 3,113,048 | 12/1963 | Thompson | 136—121 |
| 3,183,124 | 5/1965 | Jasinski | 136—210 |
| 3,201,282 | 8/1965 | Justi et al. | 136—120 |
| 3,235,473 | 2/1966 | Le Duc | 136—120 |

WINSTON A. DOUGLAS, *Primary Examiner.*

A. SKAPARS, *Assistant Examiner.*